United States Patent
Kobayashi et al.

(10) Patent No.: US 8,149,819 B2
(45) Date of Patent: Apr. 3, 2012

(54) ENUM SYSTEM, ENUM CLIENT APPARATUS AND METHOD FOR COMMUNICATING USING ENUM CLIENT APPARATUS

(75) Inventors: Kazuto Kobayashi, Kanagawa (JP); Akira Miyajima, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1453 days.

(21) Appl. No.: 11/166,236

(22) Filed: Jun. 27, 2005

(65) Prior Publication Data

US 2006/0020713 A1  Jan. 26, 2006

(30) Foreign Application Priority Data

Jul. 20, 2004  (JP) ................ P2004-211619

(51) Int. Cl.
*G06F 15/16* (2006.01)
*H04L 12/66* (2006.01)

(52) U.S. Cl. ........ 370/352; 370/353; 370/354; 370/355; 370/356; 370/395.54; 370/401; 370/466; 370/467; 709/245; 709/223; 709/224; 713/151; 713/152; 726/14

(58) Field of Classification Search ............ 370/466, 370/467, 352–356, 395.54; 709/223–232; 713/151–152; 726/14
See application file for complete search history.

(56) References Cited

U.S. PATENT DOCUMENTS

| | | | |
|---|---|---|---|
| 6,157,636 A * | 12/2000 | Voit et al. ........... | 370/353 |
| 6,292,478 B1 * | 9/2001 | Farris ................. | 370/352 |
| 6,324,264 B1 * | 11/2001 | Wiener et al. ....... | 379/88.22 |
| 6,347,085 B2 * | 2/2002 | Kelly .................. | 370/352 |
| 6,359,880 B1 * | 3/2002 | Curry et al. ......... | 370/352 |
| 6,373,817 B1 * | 4/2002 | Kung et al. .......... | 370/217 |
| 6,917,612 B2 * | 7/2005 | Foti et al. ............ | 370/352 |
| 7,028,101 B2 * | 4/2006 | Costa-Requena et al. | 709/245 |
| 7,426,566 B2 * | 9/2008 | Godwin et al. ...... | 709/230 |
| 2001/0055299 A1* | 12/2001 | Kelly .................. | 370/352 |
| 2002/0027915 A1* | 3/2002 | Foti et al. ............ | 370/392 |
| 2003/0007482 A1* | 1/2003 | Khello et al. ........ | 370/352 |
| 2003/0074461 A1* | 4/2003 | Kang et al. .......... | 709/230 |
| 2003/0193486 A1* | 10/2003 | Estrop ................. | 345/204 |
| 2004/0003114 A1* | 1/2004 | Adamczyk ........... | 709/245 |

(Continued)

FOREIGN PATENT DOCUMENTS

JP  2003-125099  4/2003

OTHER PUBLICATIONS

Network Working Group M. Mealling R. Daniel Request for Comments: 2915 Updates: 2168 Sep. 2000.*

(Continued)

*Primary Examiner* — Joe Cheng
*Assistant Examiner* — Wutchung Chu
(74) *Attorney, Agent, or Firm* — Greenblum & Bernstein, P.L.C.

(57) ABSTRACT

An ENUM system includes a Web server and an ENUM server. The Web server stores first NAPTR records corresponding to an ENUM client and another ENUM client on an IP network. The ENUM server stores second NAPTR records in which first URIs are associated with predetermined information for being linked to the Web server. In the ENUM system, the ENUM client transmits, to the ENUM server, a query for the second NAPTR record of the another ENUM client. The ENUM client then transmits, to the Web server, a request for access to the first URI included in the received second NAPTR record, and obtains the first NAPTR record corresponding to the another ENUM client.

4 Claims, 8 Drawing Sheets

U.S. PATENT DOCUMENTS

| | | | |
|---|---|---|---|
| 2004/0039906 A1* | 2/2004 | Oka et al. | 713/156 |
| 2004/0057421 A1* | 3/2004 | Kawabata et al. | 370/352 |
| 2004/0068584 A1* | 4/2004 | Costa-Requena et al. | 709/246 |
| 2004/0199649 A1* | 10/2004 | Tarnanen et al. | 709/230 |
| 2005/0027867 A1* | 2/2005 | Mueller et al. | 709/227 |
| 2006/0155984 A1* | 7/2006 | Tsuchida et al. | 713/156 |
| 2007/0106612 A1* | 5/2007 | O'Brien et al. | 705/44 |

OTHER PUBLICATIONS

"Global Implementation of ENUM: A Tutorial Paper," Feb. 8, 2002, International Telecommunication Union (ITU), Geneva, XP002402795, retrieved from the Internet: URL:www.itu.int/itudoc/itu-t/workshop/enum/004.html (retrieved on Oct. 11, 2006).

Tmdenton.com, "Privacy issues in ENUM," Oct. 21, 2003, XP002363540.

Shockey et al., "Privacy and Security Considerations in ENUM; draft-ietf-enum-privacy-security-01.txt," IETF Standard-Working-Draft, Internet Engineering Task Force, IETF, CH, vol. Enum, No. 1, Jul. 2003, XP015001847.

Peterson, "Enumservice Registration for Presence Services; draft-ietf-enum-prese-01.txt," IETF Standard-Working-Draft, Internet Engineering Task Force, IETF, CH, vol. Enum, No. 1, May 20, 2004, XP015018190.

A publication issued by ENUM Trial Japan entitled "ENUM Trial Japan First Report", May 2004, together with a partial English translation of the same.

U.S. Appl. No. 11/150,111 to Kobayashi et al., filed Jun. 13, 2005.
U.S. Appl. No. 11/150,117 to Kobayashi et al., filed Jun. 13, 2005.
U.S. Appl. No. 11/150,119 to Kobayashi et al., filed Jun. 13, 2005.

Yoneya, "Advanced Club, No. 12 ENUM Denwabango to Internet no Kakehashi", Nikkei Network, No. 47, pp. 116-120, Nikkei BP Company, Feb. 22, 2004.

Yoshiura, "DNS Server no Bunsan Kanri kara shuchu Kanri heno Iko", Joho shori gakkai Kenkyu Houkoku, No. 2001, No. 94, pp. 7-12, 2001-DSM-23-2, Shadan hojin joho shori gakkai, Oct. 5, 2001.

Chimura, "SIP, H323, ENUM—Knowing New IP Telephone Technology", pp. 104-109 and Partial translation, Jul. 22, 2002.

R. Daniel et al., "Resolution of Uniform Resource Identifiers using the Domain Name System", RFC2168 (Network Working Group Request for Comments: 2168), Jun. 1997, IETF.

R. Daniel, "A Trivial Convention for using HTTP in URN Resolution", RFC2169 (Netwaork Working Group Request for Comments: 2169), Jun. 1997, IETF.

* cited by examiner

| Enum domain name | | Order | Preference | Flags | Service | | URI scheme | |
|---|---|---|---|---|---|---|---|---|
| | | | | | | | | URI |
| 0.0.0.0.0.0.0.1.3.1.8.e164.arpa | IN NAPTR | 100 | 10 | "u" | "E2U+https" | "!^.*$!https: | //www.cnum.com/user81310000000.html" | |
| 1.0.0.0.0.0.0.1.3.1.8.e164.arpa | IN NAPTR | 100 | 10 | "u" | "E2U+https" | "!^.*$!https: | //www.cnum.com/user81310000001.html" | |

NAPTR resource record

Fig.4

| Enum domain name | | Order | Preference | Flags | Service | | URI scheme | |
|---|---|---|---|---|---|---|---|---|
| | | | | | | | | URI |
| 0.0.0.0.0.0.1.3.1.8.e164.arpa | IN NAPTR | 100 | 10 | "u" | "E2U+sip" | "!^.*$!sip:" | | 81310000000@tokyo.sip.jp" |
| | IN NAPTR | 100 | 10 | "u" | "E2U+message:mailto" | "!^.*$!mailto:" | | 81310000000@tokyo.mail.com" |
| | IN NAPTR | 100 | 10 | "u" | "E2U+http" | "!^.*$!http:" | | //www.tokyo.sip.com/user81310000000.html" |

NAPTR resource record

Fig.5

| Enum domain name | | Order | Preference | Flags | Service | | URI scheme | |
|---|---|---|---|---|---|---|---|---|
| | | | | | | | | URI |
| 1.0.0.0.0.0.0.1.3.1.8.e164.arpa | IN NAPTR | 100 | 10 | "u" | "E2U+sip" | "!^.*$!sip:" | 81310000001@tokyo.sip.jp" |
| | IN NAPTR | 100 | 10 | "u" | "E2U+message:mailto" | "!^.*$!mailto:" | 81310000001@tokyo.mail.com" |
| | IN NAPTR | 100 | 10 | "u" | "E2U+http" | "!^.*$!http:" | //www.tokyo.sip.com/user81310000001.html" |

NAPTR resource record

ENUM SYSTEM, ENUM CLIENT APPARATUS AND METHOD FOR COMMUNICATING USING ENUM CLIENT APPARATUS

BACKGROUND OF THE INVENTION

1. Field of the Invention

The present invention relates to an ENUM system, an ENUM client apparatus and a method for communicating an ENUM client apparatus.

2. Description of Related Art

Today's information society has various communications methods in the form of telephones, facsimiles, mobile phones, electronic mails and the like. The development of such communication methods requires a great effort to manage data such as individual email accounts, telephone numbers (mobile phones, business or home) and contact information.

Recently, ENUM technology has drawn attention due to its ability to effectively manage the above-noted information and to enable various communication according to individual circumstances. ENUM is designed to identify the Internet service with a unique global identification number such as the E.164 number, using the DNS (Domain Name System). Currently, the IETF (Internet Engineering Task Force) is seeking to standardize ENUM platforms, where protocol specifications are discussed (See Publication 1, for example).

In a system (hereafter referred to as "ENUM system") that includes a server (hereafter referred to as "ENUM server") applying such ENUM technology, ENUM clients are able to store such data as IP terminal protocols in the ENUM server and to obtain the stored protocols corresponding to IP terminals (e.g., SIP, HTTP), and telephone numbers or URIs used for those protocols, using the E.164 number.

In order to obtain protocols or other data corresponding to IP terminals, ENUM clients transmit a query to the ENUM server (ENUM query). ENUM clients receive, from the ENUM server, a response including such data (ENUM response) and then obtain, from the ENUM response, protocols or other data corresponding to the IP terminals.

[Publication 1] Issued by ENUM Trial Japan "ENUM Trial Japan First Report" May, 2004

However, the above-described ENUM system is problematic in that such data is at risk of being obtained by a third party on the Internet due to the fact that the data contained in the ENUM response are not encoded. The data contained in the ENUM response include personal data, such as contact information, and are subject to misuse.

SUMMARY OF THE INVENTION

The present invention is provided to address the above-described problems. The purpose of the present invention is to provide an ENUM system, an ENUM client apparatus and a method for communicating an ENUM client apparatus that ensure safe system operation by dependably preventing a situation where data transmitted from an ENUM server may be obtained by a third party.

The present invention relates to an ENUM system that includes an ENUM client apparatus, a Web server and an ENUM server. The ENUM client apparatus has an assigned E. 164 number. The Web server stores a first NAPTR resource record corresponding to another ENUM client apparatus on an IP network. The ENUM server stores a second NATPR resource record, the second NATPR resource record including a URI, the URI being associated with predetermined information for being linked to the Web server. In the ENUM system, a query is transmitted, to the ENUM server, for the second NAPTR resource record of another ENUM client based on the E.164 number assigned to another ENUM client. A request is then transmitted, to the Web server, for access to the URI included in the received second NAPTR resource record, after which the first NAPTR resource record corresponding to another ENUM client is obtained.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The embodiments of the present invention are explained in the following, in reference to the above-described drawings.

Figure 1:
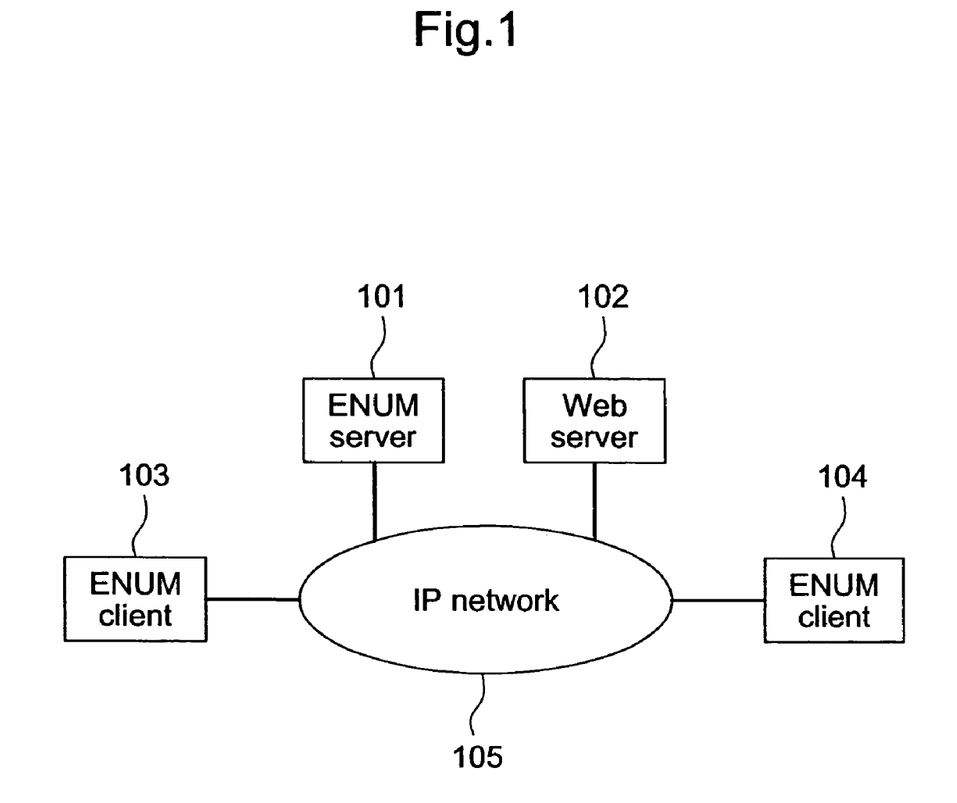
FIG. 1 illustrates a network configuration to which an ENUM system according to an embodiment of the present invention is applied.

FIG. 1 illustrates a network configuration to which an ENUM system according to an embodiment of the present invention is applied.

As shown in the figure, ENUM server 101, Web server 102 and a plurality of ENUM client apparatuses (hereafter referred to as "ENUM client") 103 and 104 are mutually connected via IP network 105 in the ENUM system according to the present embodiment. The ENUM system is not limited to this embodiment and thus may be configured to connect three or more ENUM clients on IP network 105.

ENUM clients 103 and 104 include, for example, an email communications apparatus including a mobile telephone apparatus, an Internet facsimile apparatus (hereafter referred to as "IFAX") or an IP telephone apparatus (hereafter referred to as "IP phone"). An identification number managed by ENUM server 101 is assigned to each ENUM client. This identification number is known as a unique global number. For example, the E. 164 number is assigned to each ENUM client. The following describes a case where the E.164 number is assigned to ENUM clients 103 and 104.

Each of ENUM server 101 and Web server 102 includes a database that stores a NAPTR resource record (hereafter referred to as "NAPTR record"), which is described later, although other configurations are possible. Each of ENUM server 101 and Web server 102 transmits a NAPTR record stored in the DB in response to a request from ENUM client 103 (104).

Figure 2:
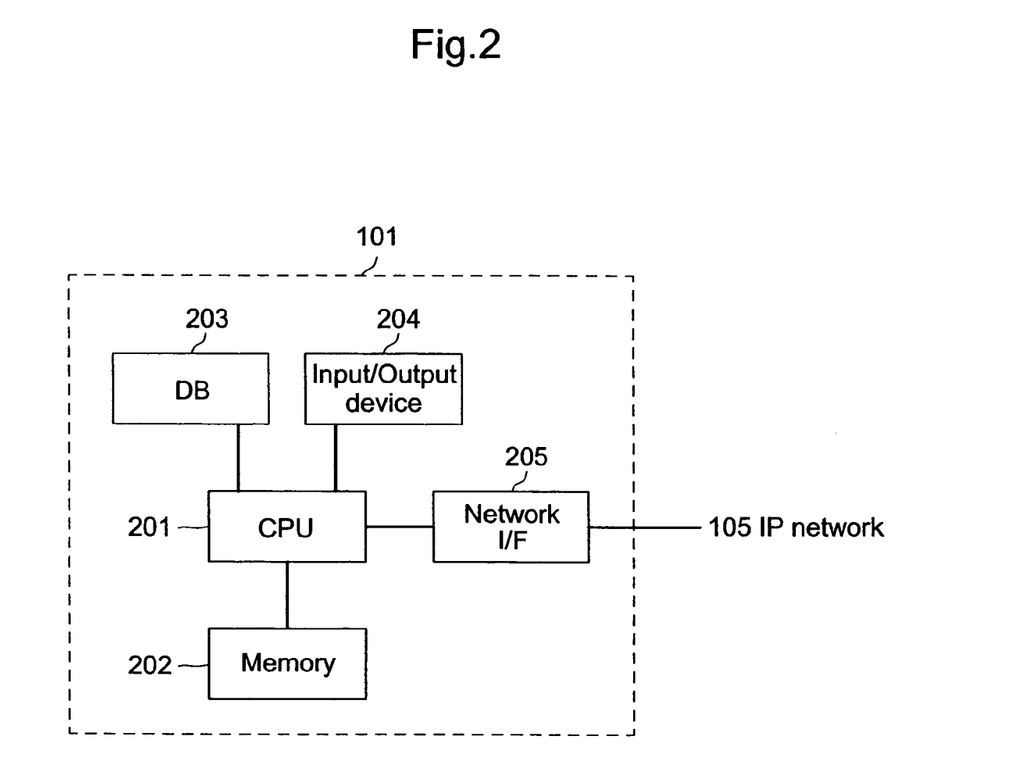
FIG. 2 illustrates a block diagram describing a typical configuration of an ENUM server in the ENUM system according to the embodiment.

FIG. 2 illustrates a block diagram describing a typical configuration of ENUM server 101 in the ENUM system according to the present embodiment. Web server 102 in the ENUM system according to the present embodiment has the same configuration except it has a different NAPTR record in the DB.

As show in the figure, ENUM server 101 includes CPU 201 that controls the entire operation of the server. Memory 202 is connected to CPU 201. Memory 202 has ROM and RAM functions. The ROM stores such programs as a control program retrieved and executed by CPU 201. The RAM functions as a work memory when CPU 201 executes the control program.

Database (DB) 203 is connected to CPU 201. DB 203 stores a NAPTR record (described later). Upon receiving a query based on the E.164 number from ENUM client 103 ("ENUM query", which is described later), for example, CPU 201 searches for a NAPTR record corresponding to the ENUM query among the data stored in DB 203 and transmits the corresponding NAPTR record to ENUM client 103 that has transmitted the ENUM query.

Furthermore, input/output device 204 is connected to CPU 201. Input/output device 204 is configured with an input device such as a key board and an output device such as a display. The input device is used, for example, to add and edit the data stored in DB 203. The output device is used, for example, by administrators of ENUM server 101 to confirm the data stored in DB 203.

Furthermore, Network Interface (I/F) 205 is connected to CPU 201. Network I/F 205 is an interface to IP network 105 to which ENUM server 101 is connected.

Particularly, in the ENUM system according to the present embodiment, DB 203 of Web server 102 stores a NAPTR record (hereafter referred to as "regular NAPTR record") specifying a protocol or the like of an intended destination terminal, the NAPTR record being originally stored in DB 203 of ENUM server 101. DB 203 of ENUM server 101 stores a NAPTR record (hereafter referred to as "NAPTR record specifying link information") specifying a URI that serves as link information for the regular NAPTR record stored in DB 203 of Web server 102.

In other words, a regular NAPTA record is not directly stored in the DB of ENUM server 101. A NAPTR record specifying link information is stored in DB 203 of ENUM server 101, while a regular NAPTR record is stored in DB 203 of Web server 102, thus providing one additional process to obtain a regular NAPTR record.

Particularly, in the ENUM system according to the present embodiment, a protocol having an encoding function is specified as the protocol type in the service field of the NAPTR record specifying link information, which is stored in DB 203 of ENUM server 101. Accordingly, data transmitted to the Internet (including data transmitted from Web server 102) are encoded when the ENUM client that has received a NAPTR record specifying link information obtains a regular NAPTR record. This prevents a third party from obtaining, through the Internet, the data stored in a regular NAPTR record.

The following describes a case where an https (hypertext transfer protocol security) is specified as the protocol type in the service field of the NAPTR record specifying link information, which is stored in DB 203 of ENUM server 101. The embodiment is not limited to this case and may specify any protocol that can encode data transmitted to the Internet when ENUM clients obtain a regular NAPTR record.

Figure 3:
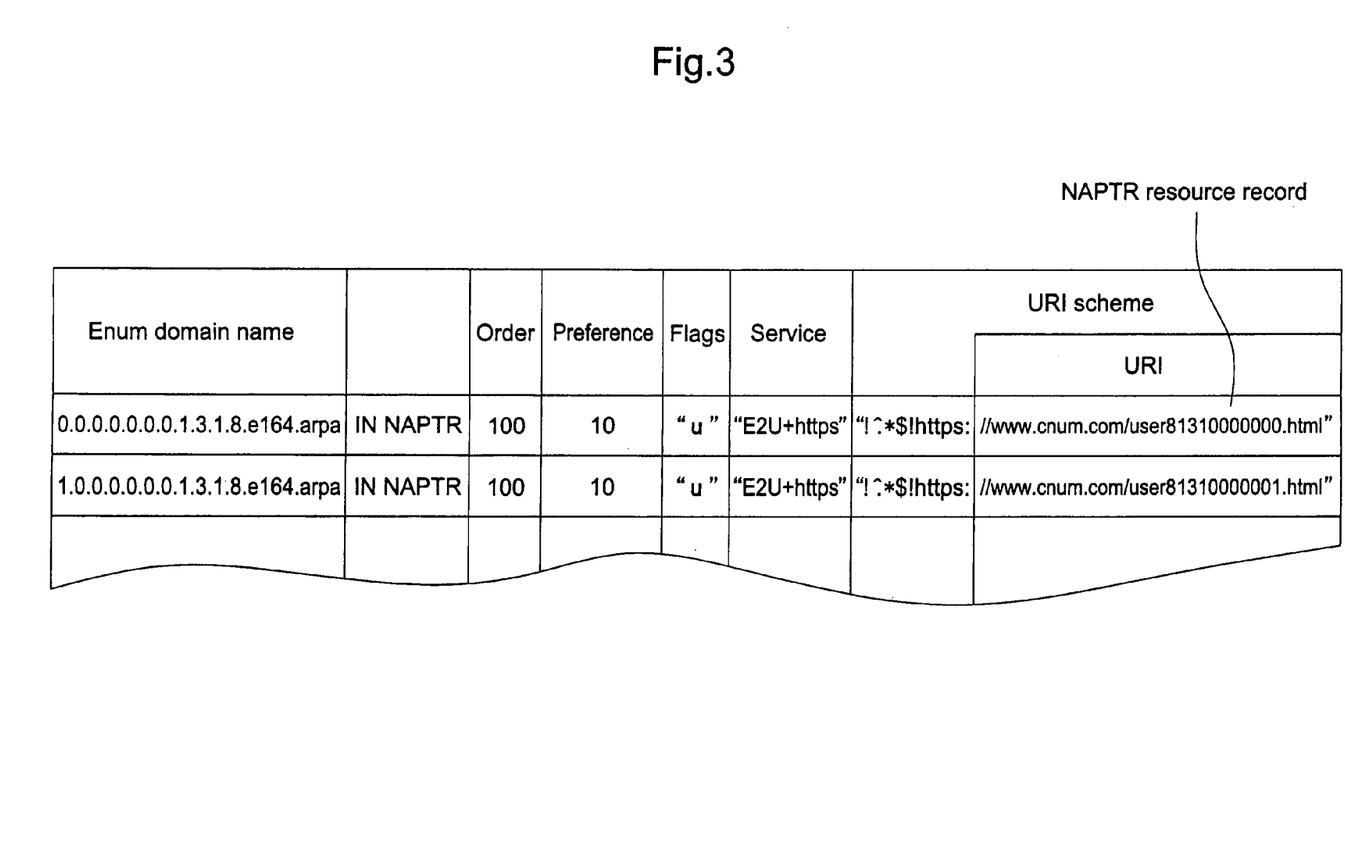
FIG. 3 illustrates an example of a NAPTR record stored in a DB of the ENUM server according to the embodiment.

FIG. 3 illustrates an example of a NAPTR record stored in DB 203 of ENUM server 101 according to the present embodiment. The figure shows a case where DB 203 stores NAPTR records corresponding to domain names obtained from E.164 numbers "+81-3-1000-0000" and "+81-3-1000-0001".

In the figure, URI "//www.enum.com/user81310000000.html" corresponds to domain name "0.0.0.0.0.0.0.1.3.1.8.e164.arpa" obtained from E.164 number "+81-3-1000-0000". The service field specifies "E2U+https", which indicates that the destination terminal is able to perform the https protocol.

URI "//www.enum.com/user81310000001.html" corresponds to domain name "1.0.0.0.0.0.0.1.3.1.8.e164.arpa" obtained from E.164 number "+81-3-1000-0001". The service field specifies "E2U+https", which indicates that the destination terminal is able to perform the https protocol.

Figure 4:
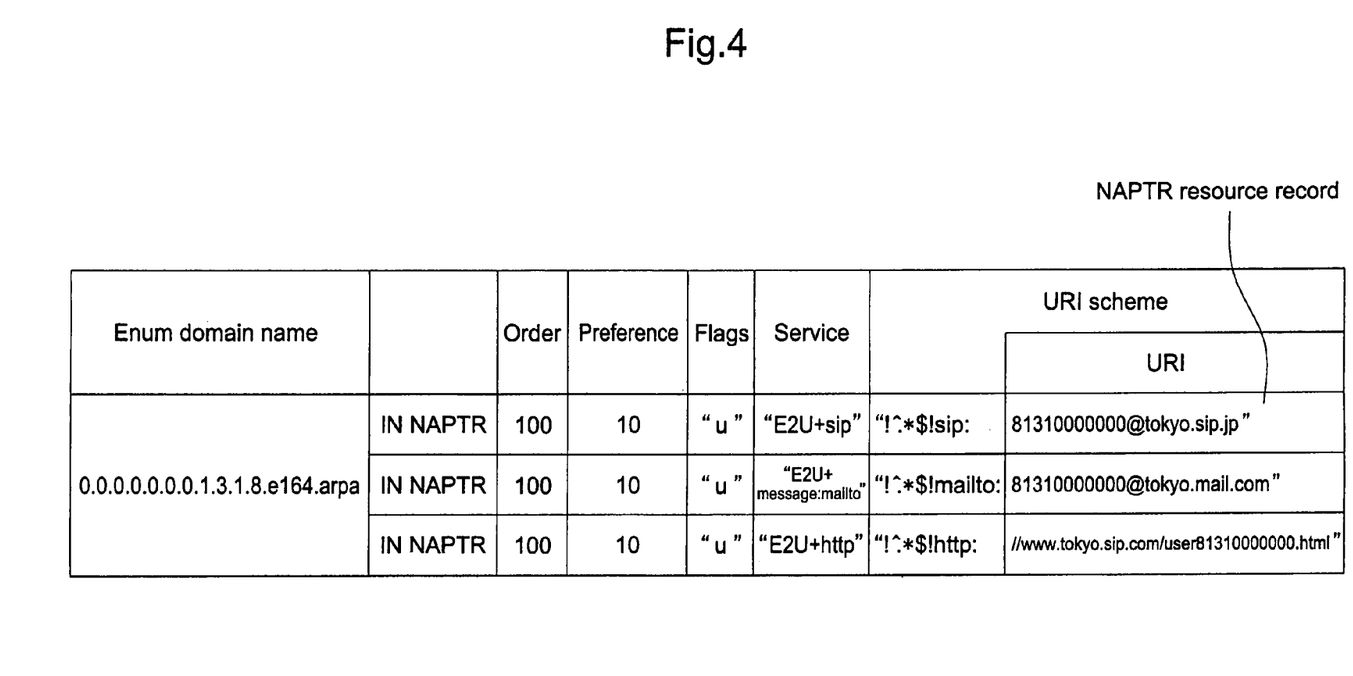
FIG. 4 illustrates an example of a NAPTR record stored in a DB of a Web server according to the embodiment.

FIG. 4 illustrates an example of a NAPTR record stored in the DB of Web server 102 according to the present embodiment. The figure shows a case where the DB of Web server 102 stores NAPTR records corresponding to a domain name obtained from E.164 number "+81-3-1000-0000".

In the figure, three URIs "81310000000@tokyo.sip.jp", "81310000000@tokyo.mail.com", "//www.tokyo.sip.com/user81310000000.html" correspond to domain name "0.0.0.0.0.0.0.1.3.1.8.e164.arpa" obtained from E.164 number "+81-3-1000-0000". In other words, the DB of Web server 102 stores three NAPTR records corresponding to the ENUM client specified by E.164 number "+81-3-1000-0000". The top service field specifies "E2U+sip", which indicates that the destination terminal is able to perform the SIP protocol. The second top service field specifies "E2U+message:mailto", which indicates that the destination terminal is able to perform emails. The third top service field specifies "E2U+http", which indicates that the destination terminal is able to deal with the Web.

Figure 5:
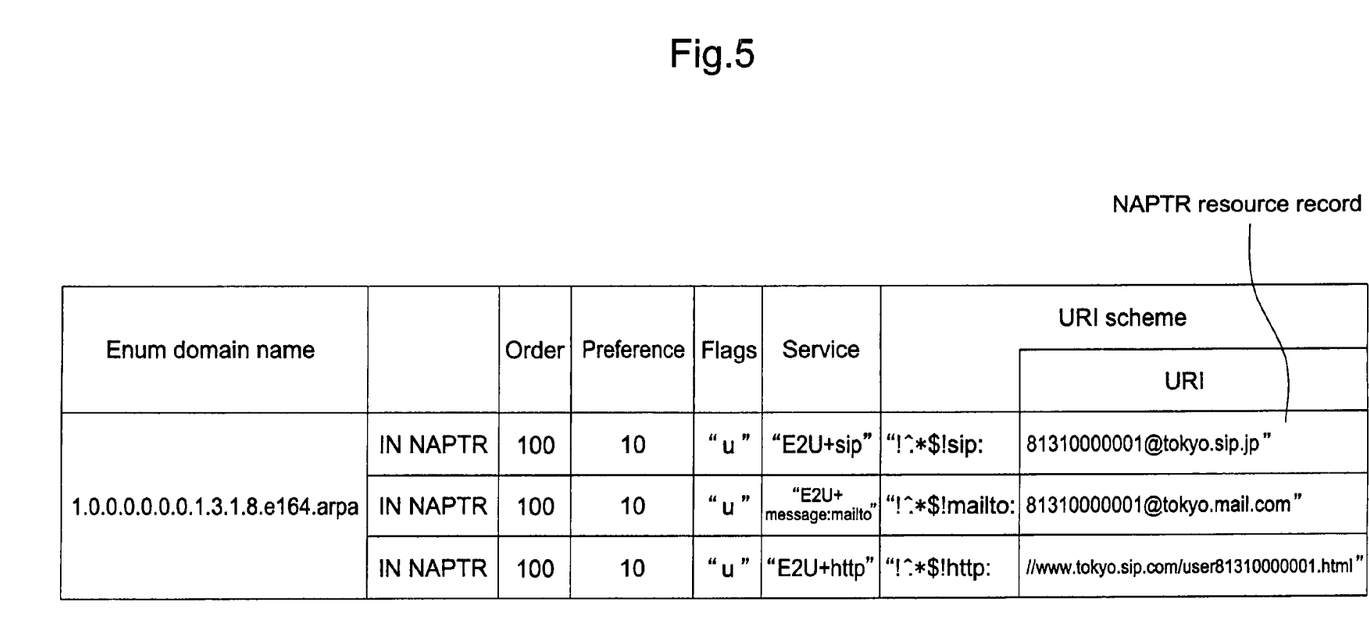
FIG. 5 illustrates an example of a NAPTR record stored in the DB of the Web server according to the embodiment.

FIG. 5 also shows an example of a NAPTR record stored in the DB of Web server 102 according to the present embodiment. FIG. 5 is the same as FIG. 4 except FIG. 5 stores a NAPTR record corresponding to a domain name obtained from E.164 number "+81-3-1000-0001", and its detailed description is therefore omitted.

Figure 6:
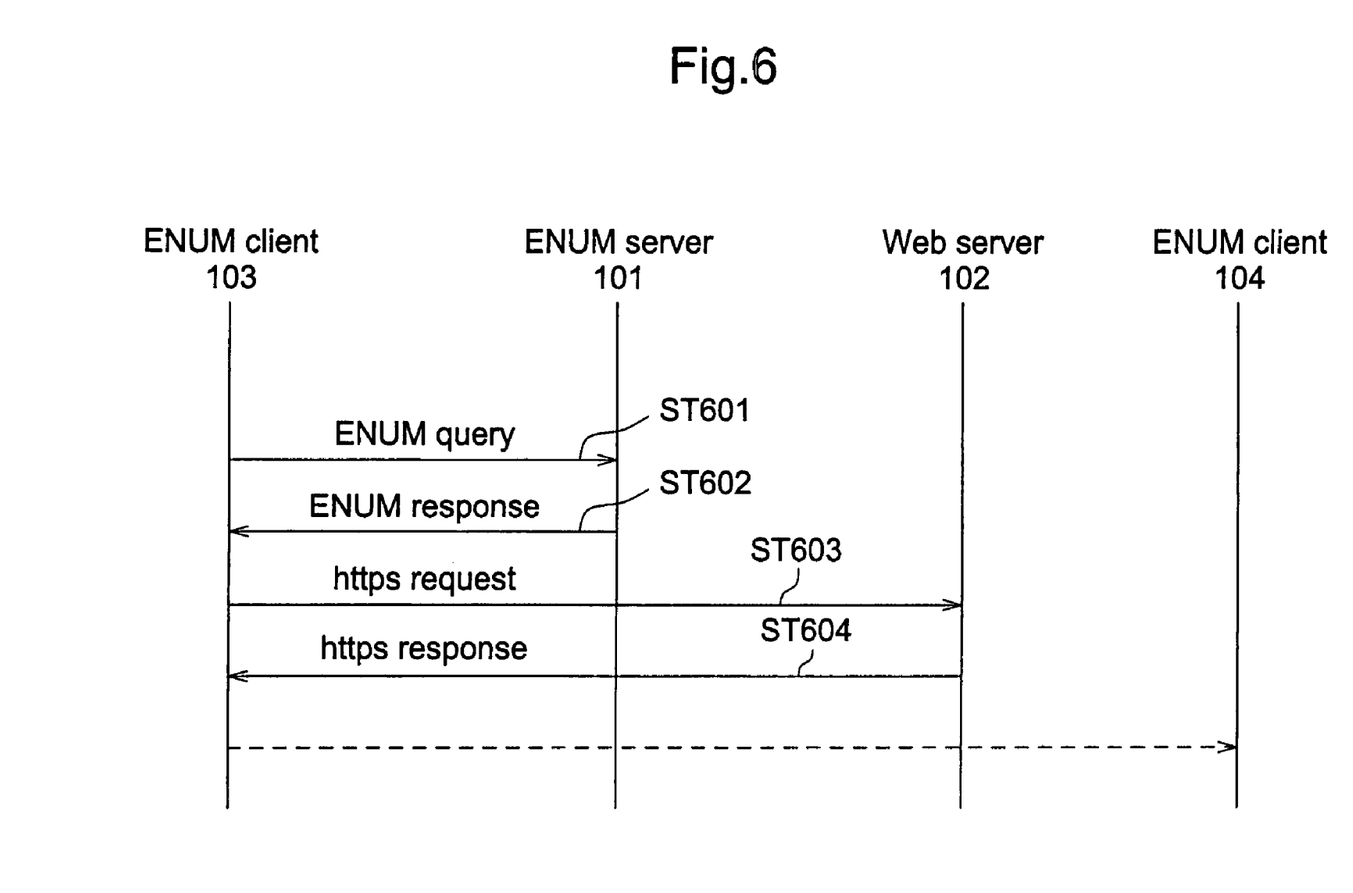
FIG. 6 illustrates a sequence diagram describing operations until an ENUM client on one end obtains data regarding an ENUM client on the other end in the ENUM system according to the embodiment.

The following describes, with reference to the FIG. 6 sequence, operations until ENUM client 103 on one end obtains a protocol or other data regarding ENUM client 104 on the other end in the ENUM system according to the present embodiment.

In this illustration, DB 203 of ENUM server 101 stores the NAPTR record shown in FIG. 3. The DB of Web server 102 stores the NAPTR records shown in FIGS. 4 and 5. E.164 number "+81-3-1000-0000" is assigned to ENUM client 103. E.164 number "+81-3-1000-0001" is assigned to ENUM client 104.

When ENUM client 103 tries to obtain a protocol or other data regarding ENUM client 104, the operator of ENUM client 103 first inputs the E.164 number of ENUM client 104, after which an instruction for transmitting the ENUM query is made. In other words, the instruction for transmitting the ENUM query is made after E.164 number "+81-3-1000-0001" is input.

After receiving the E.164 number and then the instruction for transmitting the ENUM query, ENUM client 103 transmits, to ENUM server 101, the ENUM query for a NAPTR record corresponding to the E.164 number (ST 601). In this case, ENUM client 103 first converts the operator's input E.164 number "+81-3-1000-0001" into "+81310000001", maintaining + at the beginning and the numbers. Then, non numerical symbols are deleted, and dots are inserted between the numbers, resulting in "8.1.3.1.0.0.0.0.0.0.1". Next, the numbers are reversed, and data string ".e164.arpa" is added at the end. As a result, domain name "1.0.0.0.0.0.0.1.3.1.8. e164.arpa" is obtained. Then, ENUM client 103 transmits, to ENUM server 101, the ENUM query for a NAPTR record corresponding to the domain name.

Upon receiving the ENUM query, ENUM server 101 searches for a NAPTR record corresponding to domain name "1.0.0.0.0.0.0.1.3.1.8. e164.arpa". ENUM server 101 then transmits, to ENUM client 103, the ENUM response including the corresponding NAPTR record (ST 602). In this case, ENUM server 101 retrieves the bottom NAPTR record among the NAPTR records shown in FIG. 3 and transmits, to ENUM client 103, the ENUM response including the NAPTR record.

As shown in FIG. 3, the NAPTR record specifies URI "//www.enum.com/user811310000001.html", which indicates link information for a regular NAPTR record of ENUM client 104. The service field indicates that the destination terminal is able to perform the https protocol.

When receiving the NAPTR record, ENUM client 103 transmits, to Web server 102, an https request for access to the specified URI "//www.enum.com/user81310000001.html", according to the https protocol (ST 603).

In order to make the access request according to the https protocol, it is necessary to have identification data (ID) and a password for identifying the operator of ENUM client 103. In this case, the ID and the password for identifying the operator of ENUM client 103 are previously registered. The operator of ENUM client 103 has already input the ID and the password before the https request is transmitted to Web server 102.

Upon receiving the https request, Web server 102 searches for a regular NAPTR record of the ENUM client corresponding to URI "//www.enum.com/user81310000001.html" and transmits, to ENUM client 103, an https response including a corresponding regular NAPTR record (ST 604). In this case, Web server 102 retrieves the regular NAPTR records shown in FIG. 5 and transmits, to ENUM client 103, the https response including the regular NAPTR records.

As described above, one example where ENUM client 103 on one end obtains a protocol or other data regarding ENUM client 104 on the other end is a case where ENUM clients 103 and 104 are both IP telephone apparatuses, and ENUM client 103 initiates a call to ENUM client 104. In this case, ENUM client 103 obtains the NAPTR records corresponding to ENUM client 104 shown in FIG. 5 in the above-noted sequence. ENUM client 103 then performs a call process to ENUM client 104 according to the SIP protocol using the top NAPTR record among the NAPTR records shown in FIG. 5.

When ENUM client 103 is an IP telephone apparatus, telephone number "0310000001" corresponding to E.164 number "+81-3-1000-0001", instead of the E.164 number itself, is usually input by the operator. In this case, ENUM client 103, which is an IP telephone apparatus, first converts the operator's input number "0310000001" into "+81-3-10000001" including the country code, after which the above-described processes are made.

Figure 7:
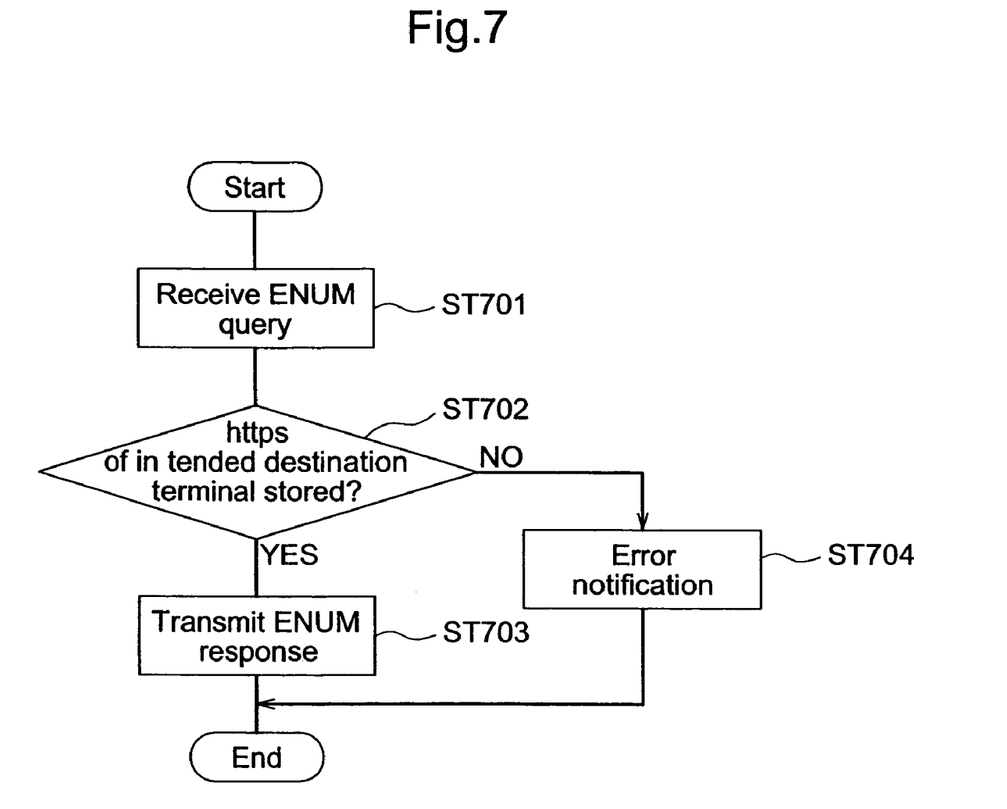
FIG. 7 illustrates a flow chart describing an operation of the ENUM server in the FIG. 6 sequence.
Figure 8:
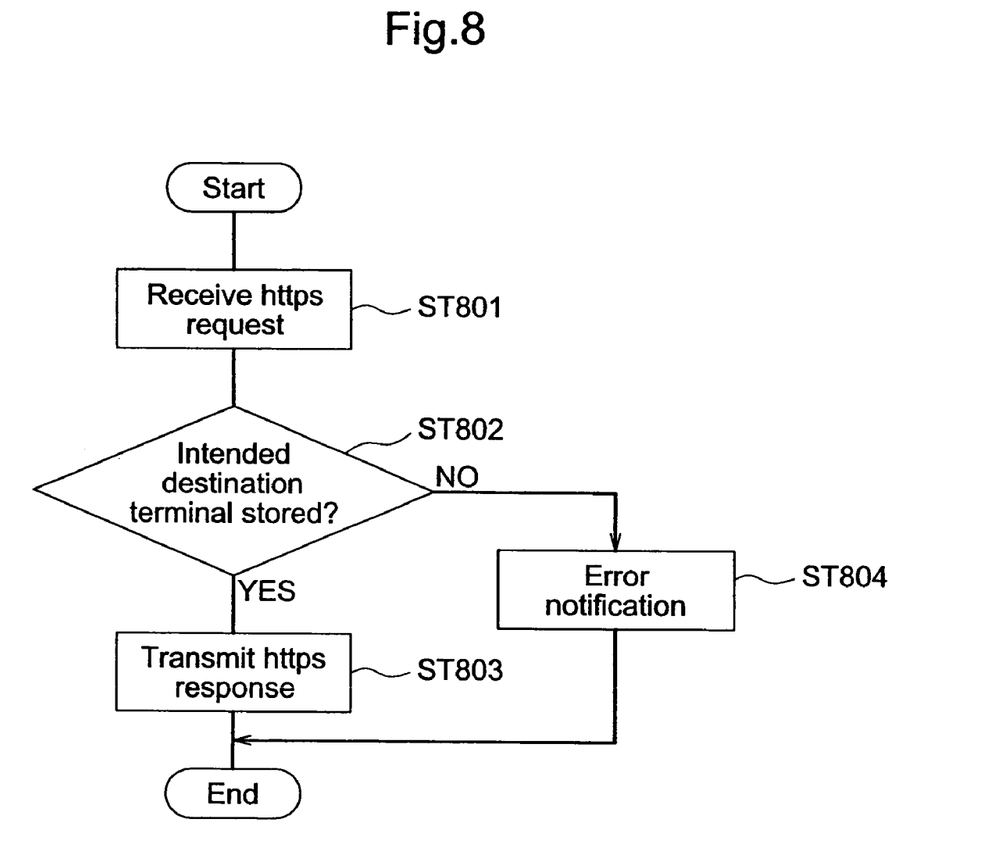
FIG. 8 illustrates a flow chart describing an operation of the Web server in the FIG. 6 sequence.

FIGS. 7 and 8 illustrate flow charts describing operations of ENUM server 101 and Web server 102 in the FIG. 6 sequence.

When receiving the ENUM query from ENUM client 103 as shown in FIG. 7 (ST 701), ENUM server 101 determines whether the DB stores a NAPTR record of the ENUM client specified as the target of inquiry in the ENUM query and whether the NAPTR record specifies the https protocol in the service field (ST 702).

When the corresponding NAPTR record is stored, ENUM server 101 transmit, to ENUM client 103, the ENUM response including the NAPTR record (ST 703) and terminates the process. On the other hand, when no corresponding NAPTR record is stored, ENUM server 101 notifies the operator of it (error notification) (ST 704) and terminates the process.

On the other hand, as shown in FIG. 8, when receiving the https request from ENUM client 103 (ST 801), Web server 102 determines whether the DB stores a regular NAPTR record of the ENUM client specified as the target to be accessed in the https request (ST 802).

When the corresponding regular NAPTR record is stored, Web server 102 creates a html form for the NAPTR record, encodes the same and transmits, to ENUM client 103, a response according to the https protocol (ST 803), after which the process is terminated. On the other hand, when no corresponding regular NAPTR record is stored, Web server 102 notifies the operator of it (error notification) (ST 804) and terminate the process.

As described above, in the ENUM system according to the present embodiment, a regular NAPTR record is not directly stored in DB 203 of ENUM server 101. A regular NAPTR record is stored in DB 203 of Web server 102 while a NAPTR record specifying link information is stored in DB 203 of ENUM server 101. A protocol having an encoding function is specified as the protocol type in the service field of the NAPTR record specifying link information.

In order to obtain a regular NAPTR record, ENUM client 103 first accesses ENUM server 101 and obtains a NAPTR record specifying link information. ENUM client 103 then accesses Web server 102 according to a protocol having an encoding function, and obtains a regular NAPTR record. Accordingly, data obtained from ENUM server 101 are limited to a NAPTR record specifying link information. Also, such data transmitted to the Internet are encoded when obtaining a regular NAPTR record specified by a NAPTR record specifying link information. This prevents a situation where the data stored in a regular NAPTR record may be obtained by a third party and thus makes secure system operation possible.

In order to obtain a regular NAPTR record, it is necessary to first access ENUM server 101 to obtain a NAPTR record specifying link information and then access Web server 102 to obtain a regular NAPTR record. It means that it requires two steps of access in order to obtain a regular NAPTR record. This process increases a security of system, providing safe system operation.

Input/output device 204 shown in FIG. 2 may be used to store individual data (NAPTR record) in DB 203 of each of ENUM server 101 and Web server 102. However, the storing process is not limited to this case. It is also possible, for example, for the DB of Web server 102 to first store a NAPTR record and then for Web server 102 to transmit, to ENUM server 101, a URL serving as link information for the stored NAPTR record, and finally for ENUM server 101 to store that URI in DB 203. In this case, administrators of the ENUM system can omit the process of individually storing data in DB 203 of ENUM server 101. As a result, the system administrator is able to work with great efficiency while data accuracy is assured.

The IP telephone apparatus described above includes an IP telephone defined by the government and operated by a telecommunications provider. It also includes an IP telephone provided on a local network or a private network using TCP/IP or other computer network protocols.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2004-211619 filed on Jul. 20, 2004 entire content of which is expressly incorporated by reference herein.

What is claimed is:

1. An ENUM (Telephone Number Mapping) system comprising:
 a requesting ENUM client apparatus;
 a Web server configured to store a plurality of first NAPTR (Naming Authority Pointer) resource records corresponding to an ENUM domain name, each of the first NAPTR resource records including a second URI (Uniform Resource Identifier) associated with a service available to a destination ENUM client apparatus; and
 an ENUM server configured to store a second NAPTR resource record corresponding to the ENUM domain name, the second NAPTR resource record including a first URI specifying link information to the plurality of first NAPTR resource records stored in the Web Server, and a protocol corresponding to the first URI,
 the requesting ENUM client apparatus being further configured to:
  input a telephone number of the destination ENUM client apparatus;
  generate an ENUM domain name based on the input telephone number;
  transmit, to the ENUM server, the generated ENUM domain name and a request for transmitting, to the requesting ENUM client apparatus, the second NAPTR resource record corresponding to the generated ENUM domain name;
  receive, from the ENUM server, the second NAPTR resource record corresponding to the generated ENUM domain name;
  transmit, to the Web server, a request to access the plurality of first NAPTR resource records, using the link information specified by the first URI included in the received second NAPTR resource record, without using the generated ENUM domain name;
  receive, from the Web server, the plurality of first NAPTR resource records addressed by the link information specified by the first URI; and
  access the destination ENUM client apparatus via the Internet, based on the second URI included in one of the received plurality of first NAPTR resource records, wherein the ENUM server is further configured to determine whether the protocol included in the second NAPTR resource record corresponding to the ENUM domain name received from the requesting ENUM client apparatus is a predetermined protocol, which is operable to encrypt data for transmission, to transmit the second NAPTR resource record to the requesting ENUM client apparatus, when it is determined that the protocol included in the second NAPTR resource record is the predetermined protocol, and to transmit an error indication to the requesting ENUM client apparatus, when it is determined that the protocol included in the second NAPTR resource record is not the predetermined protocol,
 wherein when the requesting ENUM client apparatus receives, from the ENUM server, the second NAPTR resource record including the predetermined protocol, the requesting ENUM client apparatus transmits, to the Web server, the request to access the plurality of first NAPTR resource records, utilizing the predetermined protocol, and receives, from the Web server, the encrypted plurality of first NAPTR resource records, utilizing the predetermined protocol,
 wherein the requesting ENUM client apparatus receives, from the ENUM server, the error indication, and
 wherein for every domain name transmitted to the ENUM server, the second URI to access the destination ENUM client apparatus is obtained by reference to the Web server based upon the link information specified by the first URI corresponding to the transmitted domain name in the ENUM server.

2. The ENUM system according to claim 1, wherein the predetermined protocol comprises a https protocol.

3. A method for communication using an ENUM (Telephone Number Mapping) client apparatus and an ENUM server, the ENUM client apparatus being connected to a Web server and to the ENUM server, the Web server storing a plurality of first NAPTR (Naming Authority Pointer) resource records corresponding to an ENUM domain name, each of the first NAPTR resource records including a second URI (Uniform Resource Identifier) associated with a service available to a destination ENUM client apparatus, the ENUM server storing a second NAPTR resource record corresponding to the ENUM domain name, the second NAPTR resource record including a first URI specifying link information to the plurality of first NAPTR resource records stored in the Web Server, and a protocol corresponding to the first URI, the method comprising:
 inputting, at the ENUM client apparatus, a telephone number of the destination ENUM client apparatus;
 generating, at the ENUM client apparatus, an ENUM domain name based on the input telephone number;
 transmitting, from the ENUM client apparatus to the ENUM server, the generated ENUM domain name and a request for transmitting, to the ENUM client apparatus, the second NAPTR resource record corresponding to the generated ENUM domain name;
 receiving, at the ENUM server, the ENUM domain name and the request transmitted by the ENUM client apparatus;
 determining, at the ENUM server, whether the protocol included in the second NAPTR resource record corresponding to the ENUM domain name received from the ENUM client apparatus is a predetermined protocol, the predetermined protocol being operable to encrypt data for transmission, transmitting, from the ENUM server to the ENUM client apparatus, the second NAPTR resource record corresponding to the received ENUM domain name, when it is determined that the protocol included in the second NAPTR resource record is the predetermined protocol, receiving, at the ENUM client apparatus, from the ENUM server, the second NAPTR resource record corresponding to the generated ENUM domain name;

transmitting, from the ENUM server to the ENUM client apparatus, an error indication, when it is determined that the protocol included in the second NAPTR resource record is not the predetermined protocol;

receiving, at the ENUM client apparatus, from the ENUM server, the error indication, transmitting, from the ENUM client apparatus to the Web server, a request to access the plurality of first NAPTR resource records, using the first URI included in the received second NAPTR resource record, without using the generated ENUM domain name;

receiving, at the ENUM client apparatus from the Web server, the plurality of first NAPTR resource records addressed by the link information specified by the first URI; and accessing, by the ENUM client apparatus, the destination ENUM client apparatus via the Internet, based on the second URI included in one of the received plurality of first NAPTR resource records, wherein when the ENUM client apparatus receives, from the ENUM server, the second NAPTR resource record including the predetermined protocol, the ENUM client apparatus transmits, to the Web server, the request to access the plurality of first NAPTR resource records, utilizing the predetermined protocol, and receives, from the Web server, the encrypted plurality of first NAPTR resource records, utilizing the predetermined protocol, and wherein for every domain name transmitted to the ENUM server, the second URI to access the destination ENUM client apparatus is obtained by reference to the Web server based upon the link information specified by the first URI corresponding to the transmitted domain name in the ENUM server.

4. The method according to claim 3, wherein the predetermined protocol comprises a https protocol.

* * * * *